US012767008B2

(12) United States Patent
Hoshino et al.

(10) Patent No.: US 12,767,008 B2
(45) Date of Patent: Oct. 20, 2026

(54) VEHICLE

(71) Applicant: SUBARU CORPORATION, Tokyo (JP)

(72) Inventors: Suharu Hoshino, Tokyo (JP); Isao Tsukui, Tokyo (JP); Ayumi Fukamachi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 275 days.

(21) Appl. No.: 18/710,519

(22) PCT Filed: Nov. 30, 2022

(86) PCT No.: PCT/JP2022/044218

§ 371 (c)(1),
(2) Date: May 15, 2024

(87) PCT Pub. No.: WO2024/116338

PCT Pub. Date: Jun. 6, 2024

(65) Prior Publication Data

US 2026/0167058 A1 Jun. 18, 2026

(51) Int. Cl.
*B60L 58/27* (2019.01)
*B60L 53/00* (2019.01)

(52) U.S. Cl.
CPC ............... *B60L 58/27* (2019.02); *B60L 53/00* (2019.02)

(58) Field of Classification Search
CPC ................................ B60L 58/27; B60L 53/00
See application file for complete search history.

(56) References Cited

U.S. PATENT DOCUMENTS 11,407,324 B2 * 8/2022 Bode ........................ B60L 53/14
2014/0042967 A1 * 2/2014 Herzog ................... B60L 53/31 320/109
2014/0091764 A1 * 4/2014 Kinomura ............... B60L 53/11 320/109

(Continued)

FOREIGN PATENT DOCUMENTS

JP 2013-183523 A 9/2013
JP 2018-157718 A 10/2018

(Continued)

OTHER PUBLICATIONS

International Search Report received in PCT Application No. PCT/JP2022/044218, dated Feb. 21, 2023.

(Continued)

*Primary Examiner* — Richard M Camby
(74) *Attorney, Agent, or Firm* — Rimon P.C.

(57) ABSTRACT

A vehicle includes: a direct-current charging inlet; an alternating-current charging inlet; a battery that is configured to drive a motor and connectable to the direct-current charging inlet and the alternating-current charging inlet; temperature control equipment configured to raise a temperature of the battery; and a connection circuit that connects the direct-current charging inlet, the alternating-current charging inlet, the battery, and the temperature control equipment. The connection circuit includes detour circuits that detour around the battery and connect the alternating-current charging inlet and the temperature control equipment.

17 Claims, 10 Drawing Sheets

(56) References Cited

U.S. PATENT DOCUMENTS

| | | | | |
|---|---|---|---|---|
| 2016/0193933 | A1* | 7/2016 | Jiang | B60L 53/305<br>320/109 |
| 2017/0253134 | A1* | 9/2017 | Berger | B60L 53/14 |
| 2018/0201142 | A1* | 7/2018 | Galin | B60L 53/14 |
| 2018/0272884 | A1 | 9/2018 | Kojima et al. | |
| 2019/0305393 | A1 | 10/2019 | Oguma | |
| 2022/0144104 | A1* | 5/2022 | Lasson | B60L 53/11 |

FOREIGN PATENT DOCUMENTS

| | | | |
|---|---|---|---|
| JP | 2019-180111 | A | 10/2019 |
| JP | 2019-180124 | A | 10/2019 |
| JP | 2021-118629 | A | 8/2021 |

OTHER PUBLICATIONS

Notice of Reasons for Refusal issued in corresponding Japanese Patent Application No. 2024-561068, dated Feb. 10, 2026.

* cited by examiner

VEHICLE

CROSS-REFERENCE TO RELATED APPLICATIONS

This application is the U.S. National Phase under 35 U.S.C. § 371 of International Application No. PCT/JP2022/044218, filed on Nov. 30, 2022.

TECHNICAL FIELD

The disclosure relates to a vehicle.

BACKGROUND ART

When a known battery mounted in a vehicle is at a low temperature (e.g., when the temperature of the battery is less than a predetermined value such as less than 0° C.), performance of the battery may deteriorate, and a charging time for charging the battery may become long. When the battery is at a low temperature, charging the battery may accelerate the degree of progress of deterioration of the battery. Therefore, Patent Literature 1 discloses providing a heater for raising the temperature of a battery mounted in a vehicle.

CITATION LIST

Patent Literature

Patent Literature 1: JP 2018-157718

SUMMARY

Technical Problem

In a case where a battery is at a low temperature, when the battery is charged while the temperature of the battery is raised by a beater, the current supplied to the battery decreases by the amount of the current supplied to the heater, and as a result, the charging time of the battery may become long.

An object of the disclosure is to provide a vehicle that can shorten the charging time of a battery even when the battery is at a low temperature.

Solution to Problem

In order to solve the above problem, a vehicle according to the disclosure includes:

- a direct-current charging inlet;
- an alternating-current charging inlet;
- a battery that is configured to drive a motor, and connectable to the direct-current charging inlet and the alternating-current charging inlet, the battery being for driving a motor;
- temperature control equipment that configured to raise a temperature of the battery; and
- a connection circuit that connects the direct-current charging inlet, the alternating-current charging inlet, the battery, and the temperature control equipment.

The connection circuit includes a detour circuit that detours around the battery and connects the alternating-current charging inlet and the temperature control equipment.

Advantageous Effects of Invention

According to the disclosure, it is possible to shorten the charging time of a battery even when the battery is at a low temperature.

DESCRIPTION OF EMBODIMENT

An embodiment of the disclosure will be described in detail below with reference to the accompanying drawings. Specific dimensions, materials, numerical values, and the like presented in such embodiment are merely examples for facilitating understanding of the invention, and do not limit the disclosure unless otherwise specified. Note that in the present specification and the drawings, redundant descriptions with respect to elements having substantially the same function and configuration are omitted because the same reference signs will be used, and elements that are not directly related to the embodiment of the disclosure are omitted from the drawings.

Figure 1:
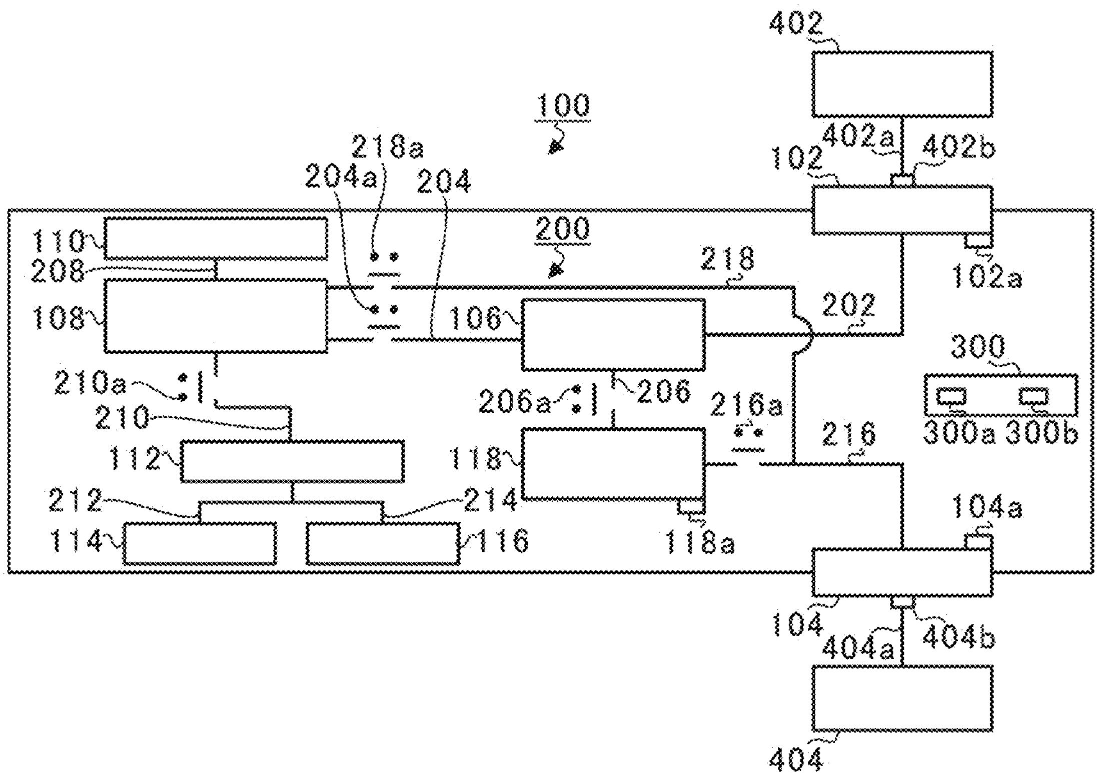
FIG. 1 is an explanatory view for describing a schematic configuration of a vehicle according to the present embodiment.

FIG. 1 is an explanatory view for describing a schematic configuration of a vehicle 100 according to the present embodiment. Here, as the vehicle 100, an electric vehicle will be described. However, the vehicle 100 only needs to include at least a motor not illustrated for causing the vehicle

100 to travel and a battery 118 for driving the motor, and may be, for example, a hybrid vehicle including an engine and a motor.

The vehicle 100 includes an alternating-current charging inlet 102, a direct-current charging inlet 104, an in-vehicle charger 106, a DC/DC converter 108, an auxiliary machine 110, a junction box 112, an air conditioner 114, the temperature control equipment 116, a battery 118, a connection circuit 200, and a control device 300.

The alternating-current charging inlet 102 is a power receiving unit that receives power supply from an external charging facility. The alternating-current charging inlet 102 is, for example, a power receiving unit that receives supply of an alternating current from an alternating-current charging station 402.

The alternating-current charging station 402 includes a cable 402*a* and a connector 402*b*. The cable 402*a* connects an alternating-current power source not illustrated and the connector 402*b* of the alternating-current charging station 402. The cable 402*a* includes a structural expansion/contraction part having a winding structure, for example, and is configured to be expandable/contractible from the alternating current charging station 402 to the alternating-current charging inlet 102.

The connector 402*b* is configured to be electrically connectable to the alternating-current charging inlet 102. For example, contacts are built in both the alternating-current charging inlet 102 and the connector 402*b*. When the connector 402*b* is attached to the alternating-current charging inlet 102, the contacts come into contact with each other, and the alternating-current charging inlet 102 and the connector 402*b* are electrically connected. The connector 402*b* can supply an alternating current from the alternating-current power source not illustrated to the alternating-current charging inlet 102.

The direct-current charging inlet 104 is a power receiving unit that receives power supply from an external charging facility. The direct-current charging inlet 104 is, for example, a power receiving unit that receives supply of a direct current from a direct-current charging station 404. Note that the charging output of the direct-current charging station 404 is larger than the charging output of the alternating-current charging station 402. Therefore, charging with the direct current supplied from the direct-current charging station 404 becomes quick charging that is faster than charging with the alternating current supplied from the alternating-current charging station 402. The alternating-current charging station 402 can cause the battery 118 to perform normal charging, and the direct-current charging station 404 can cause the battery 118 to perform quick charging.

The direct-current charging station 404 includes a cable 404*a* and a connector 404*b*. The cable 404*a* connects a direct-current power source not illustrated and the connector 404*b* of the direct-current charging station 404. The cable 404*a* includes a structural expansion/contraction part having a winding structure, for example, and is configured to be expandable/contractible from the direct-current charging station 404 to the direct-current charging inlet 104.

The connector 404*b* is configured to be electrically connectable to the direct-current charging inlet 104. For example, contacts are built in both the direct-current charging inlet 104 and the connector 404*b*. When the connector 404*b* is attached to the direct-current charging inlet 104, the contacts come into contact with each other, and the direct-current charging inlet 104 and the connector 404*b* are electrically connected. The connector 404*b* can supply a direct current from the direct-current power source not illustrated to the direct-current charging inlet 104.

The in-vehicle charger 106 is a power converter for converting the alternating current supplied from the alternating-current charging inlet 102 into a direct current. The DC/DC converter 108 is a conversion device that steps down the direct current supplied from the in-vehicle charger 106 to the direct current necessary for the auxiliary machine 110.

The auxiliary machine 110 is equipment that operates by the direct current supplied from the DC/DC converter 108 and operates at a low voltage such as 12 V, and is, for example, a car navigation system, an in-vehicle camera, or the like.

The junction box 112 includes terminals used for coupling, branching, and relaying electric wires. The junction box 112 includes a relay not illustrated that can open and close the connection among the DC/DC converter 108, the air conditioner 114, and the temperature control equipment 116. The relay of the junction box 112 is controlled by the control device 300, and brings the DC/DC converter 108 and the air conditioner 114 into a connected state or a non-connected state, or brings the DC/DC converter 108 and the temperature control equipment 116 into a connected state or a non-connected state.

The air conditioner 114 includes a compressor and operates the compressor to perform air-conditioning of the interior of the vehicle. The temperature control equipment 116 is configured to be able to raise the temperature of the battery 118, and is a device that heats the battery 118 by generating Joule heat using the current supplied from the connection circuit 200, for example. The temperature control equipment 116 includes, for example, a heater. The air conditioner 114 and the temperature control equipment 116 operate at a low voltage such as 12 V, for example.

The battery 118 is a battery that stores electric power for driving the motor not illustrated mainly mounted in the vehicle 100. The battery 118 is configured to be electrically connectable to the alternating-current charging inlet 102 and the direct-current charging inlet 104, and can perform normal charging or quick charging by the current supplied from the alternating-current charging inlet 102 or the direct-current charging inlet 104.

The connection circuit 200 is a circuit connecting the alternating-current charging inlet 102, the direct-current charging inlet 104, the in-vehicle charger 106, the DC/DC converter 108, the auxiliary machine 110, the junction box 112, the air conditioner 114, the temperature control equipment 116, and the battery 118.

The connection circuit 200 includes a first connection circuit 202, a second connection circuit 204, a third connection circuit 206, a fourth connection circuit 208, a fifth connection circuit 210, a sixth connection circuit 212, a seventh connection circuit 214, an eighth connection circuit 216, and a ninth connection circuit 218.

The first connection circuit 202 electrically connects the alternating current charging inlet 102 and the in-vehicle charger 106. The first connection circuit 202 supplies an alternating current from the alternating-current charging inlet 102 to the in-vehicle charger 106. The second connection circuit 204 electrically connects the in-vehicle charger 106 and the DC/DC converter 108. The second connection circuit 204 supplies a direct current from the in-vehicle charger 106 to the DC/DC converter 108.

The third connection circuit 206 electrically connects the in-vehicle charger 106 and the battery 118. The third connection circuit supplies a direct current from the in-vehicle charger 106 to the battery 118. The fourth connection circuit

208 electrically connects the DC/DC converter 108 and the auxiliary machine 110. The fourth connection circuit 208 supplies a direct current from the DC/DC converter 108 to the auxiliary machine 110.

The fifth connection circuit 210 electrically connects the DC/DC converter 108 and the junction box 112. The fifth connection circuit 210 supplies a direct current from the DC/DC converter 108 to the junction box 112.

The sixth connection circuit 212 electrically connects the junction box 112 and the air conditioner 114. The sixth connection circuit 212 supplies a direct current from the junction box 112 to the air conditioner 114. The seventh connection circuit 214 electrically connects the junction box 112 and the temperature control equipment 116. The seventh connection circuit 214 supplies a direct current from the junction box 112 to the temperature control equipment 116.

The eighth connection circuit 216 electrically connects the direct-current charging inlet 104 and the battery 118. The eighth connection circuit 216 supplies a direct current from the direct-current charging inlet 104 to the battery 118. The ninth connection circuit 218 electrically connects the eighth connection circuit 216 and the DC/DC converter 108. The ninth connection circuit 218 is a branch circuit branched from the eighth connection circuit 216. The ninth connection circuit 218 supplies a direct current from the direct-current charging inlet 104 to the DC/DC converter 108 via a part of the eighth connection circuit 216.

The connection circuit 200 includes a second connection circuit relay 204*a*, a third connection circuit relay 206*a*, a fifth connection circuit relay 210*a*, an eighth connection circuit relay 216*a*, and a ninth connection circuit relay 218*a*.

The second connection circuit relay 204*a* is provided in the second connection circuit 204. The second connection circuit relay 204*a* is controlled to be on/off by the control device 300 to bring the in-vehicle charger 106 and the DC/DC converter 108 into a connected state or a non-connected state.

The third connection circuit relay 206*a* is provided in the third connection circuit 206. The third connection circuit relay 206*a* is controlled to be on/off by the control device 300 to bring the in-vehicle charger 106 and the battery 118 into a connected state or a non-connected state.

The fifth connection circuit relay 210*a* is provided in the fifth connection circuit 210. The fifth connection circuit relay 210*a* is controlled to be on/off by the control device 300 to bring the DC/DC converter 108 and the junction box 112 into a connected state or a non-connected state.

The eighth connection circuit relay 216*a* is provided in the eighth connection circuit 216. The eighth connection circuit relay 216*a* is controlled to be on/off by the control device 300 to bring the direct-current charging inlet 104 and the battery 118 into a connected state or a non-connected state.

The ninth connection circuit relay 218*a* is provided in the ninth connection circuit 218. The ninth connection circuit relay 218*a* is controlled to be on/off by the control device 300 to bring the direct-current charging inlet 104 and the DC/DC converter 108 into a connected state or a non-connected state.

The control device 300 executes charging control of charging the battery 118. The control device 300 is connected to each member provided in the above-described vehicle 100 by a control line not illustrated. The control device 300 includes one or more processors 300*a* and one or more memories 300*b* connected to the processor 300*a*. The processor 300*a* includes, for example, a central processing unit (CPU). The memory 300*b* includes, for example, a read only memory (ROM), a random access memory (RAM), and the like. The ROM is a storage element that stores programs, arithmetic parameters, and the like used by the CPU. The RAM is a storage element that temporarily stores data such as variables and parameters used for processing executed by the CPU.

Figure 2:
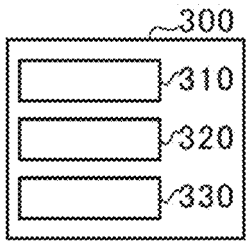
FIG. 2 is a block diagram illustrating an example of a functional configuration of a control device.

FIG. 2 is a block diagram illustrating an example of the functional configuration of the control device 300. For example, as illustrated in FIG. 2, the control device 300 includes an inlet connection detection unit 310, a battery temperature detection unit 320, and a charging control unit 330. Note that various types of processing including the processing described below performed by the inlet connection detection unit 310, the battery temperature detection unit 320, or the charging control unit 330 can be executed by the processor 300*a*. For example, the processor 300*a* executes a program stored in the memory 300*b*, thereby executing various types of processing.

The inlet connection detection unit 310 detects connection between the alternating-current charging inlet 102 and the connector 402*b* and connection between the direct-current charging inlet 104 and the connector 404*b*. For example, the alternating current charging inlet 102 is provided with a sensor 102*a* that detects connection with the connector 402*b*. The inlet connection detection unit 310 detects the connection between the alternating-current charging inlet 102 and the connector 402*b* based on a detection signal of the sensor 102*a*.

Similarly, the direct-current charging inlet 104 is provided with a sensor 104*a* that detects connection with the connector 404*b*. The inlet connection detection unit 310 detects the connection between the direct-current charging inlet 104 and the connector 404*b* based on a detection signal of the sensor 104*a*.

The battery temperature detection unit 320 detects the temperature of the battery 118. For example, the battery 118 is provided with a sensor 118*a* that detects the temperature of the battery 118. The battery temperature detection unit 320 detects the temperature of the battery 118 based on a detection signal of the sensor 118*a*.

The charging control unit 330 controls the in-vehicle charger 106, the DC/DC converter 108, and the junction box 112. The charging control unit 330 controls on/off of the relays of the second connection circuit relay 204*a*, the third connection circuit relay 206*a*, the fifth connection circuit relay 210*a*, the eighth connection circuit relay 216*a*, the ninth connection circuit relay 218*a*, and the junction box 112. This implements charging control of the battery 118 mounted in the vehicle 100.

For example, the charging control unit 330 controls the on/off of each relay based on detection results of the inlet connection detection unit 310 and the battery temperature detection unit 320. When the charging control unit 330 performs on-control on each relay, the circuit provided with each relay is brought into a connected state. When the charging control unit 330 performs off-control on each relay, the circuit provided with each relay is brought into a non-connected state.

Next, control content of the charging control unit 330 will be described in detail. Here, charging control of the battery 118 when the vehicle 100 receives current supply from both the alternating-current charging station 402 and the direct-current charging station 404 will be described.

Figure 3:
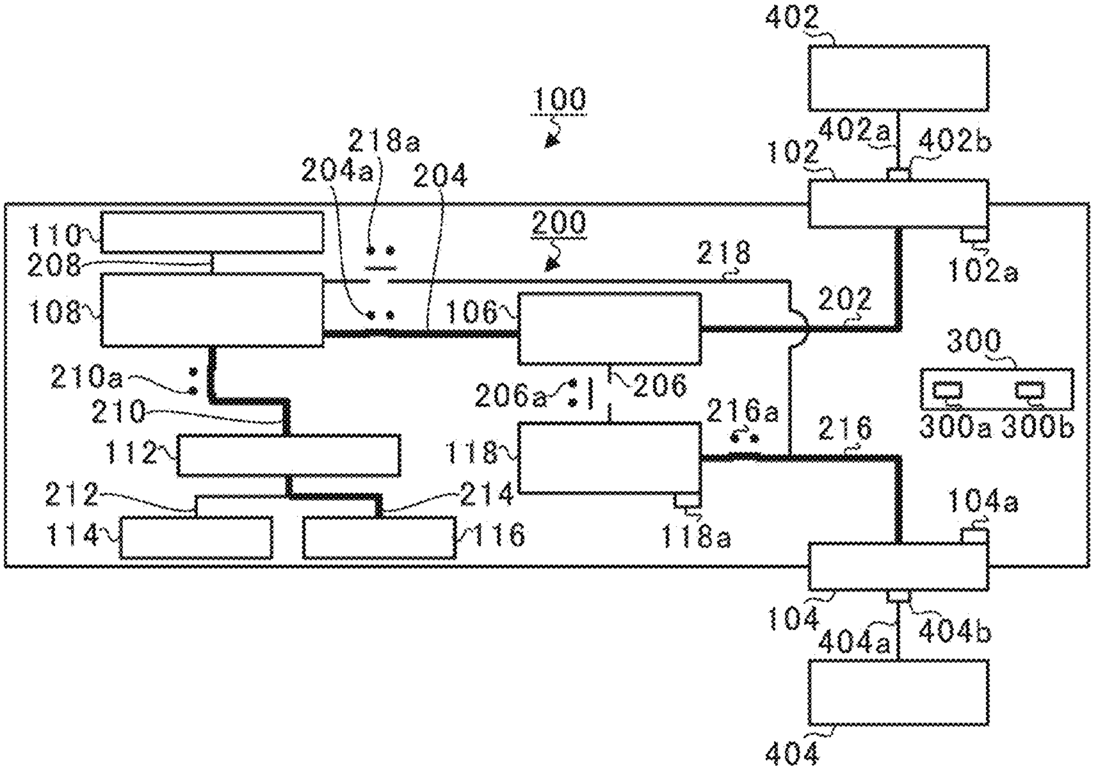
FIG. 3 is an explanatory view illustrating an example of battery charging control when the vehicle receives current supply from both an alternating-current charging station and a direct-current charging station.

FIG. 3 is an explanatory view illustrating an example of charging control of the battery 118 when the vehicle 100 receives current supply from both the alternating-current charging station 402 and the direct-current charging station 404. In the figure, a thick line indicates a state where a current flows through each circuit. FIG. 3 describes charging control when the battery 118 is at a low temperature, that is, the temperature of the battery 118 becomes less than a predetermined value. Here, the predetermined value is, for example, 0° C.

For example, in FIG. 3, the inlet connection detection unit 310 is in a state of detecting the connection between the alternating-current charging inlet 102 and the connector 402*b* and detecting the connection between the direct-current charging inlet 104 and the connector 404*b*. The battery temperature detection unit 320 is in a state of detecting the temperature of the battery 118 that becomes less than 0° C.

The condition of the connection between the alternating current charging inlet 102 and the connector 402*b*, the connection between the direct-current charging inlet 104 and the connector 404*b*, and the temperature of the battery 118 becoming less than 0° C. is defined as a first condition.

When the state of the vehicle 100 satisfies the first condition, the charging control unit 330 executes charging control of charging the battery 118 by supplying a current from the direct-current charging inlet 104 to the battery 118 while supplying a current from the alternating-current charging inlet 102 to the temperature control equipment 116.

For example, as illustrated in FIG. 3, the charging control unit 330 performs off-control on the third connection circuit relay 206*a* and the ninth connection circuit relay 218*a*. With this, the third connection circuit 206 and the ninth connection circuit 218 are broken and each brought into a non-connected state.

On the other hand, the charging control unit 330 performs on-control on the second connection circuit relay 204*a*, the fifth connection circuit relay 210*a*, and the eighth connection circuit relay 216*a*. With this, the second connection circuit 204, the fifth connection circuit 210, and the eighth connection circuit 216 are conducted and brought into a connected state. This can supply the current from the direct-current charging inlet 104 to the battery 118 while supplying the current from the alternating-current charging inlet 102 to the temperature control equipment 116.

Here, in the case where the temperature of the battery 118 is less than the predetermined value, the performance of the battery 118 may deteriorate, and the charging time for charging the battery 118 may become long. In the case where the temperature of the battery 118 is less than the predetermined value, charging the battery 118 may accelerate the degree of progress of deterioration of the battery 118. Therefore, when the battery 118 is charged, in the case where the temperature of the battery 118 is less than the predetermined value, the temperature of the battery 118 needs to be raised to be equal to or greater than the predetermined value.

However, for example, when the vehicle 100 receives power supply from one power source, a part of the current supplied from the one power source is used for the temperature control equipment 116. Therefore, the current supplied from one power source to the battery 118 decreases by the amount used for the temperature control equipment 116, and as a result, the charging time of the battery 118 increases.

Therefore, as illustrated in FIG. 3, when the vehicle 100 receives current supply from both the alternating current charging station 402 and the direct-current charging station 404, the charging control unit 330 supplies a current from the alternating-current charging station 402 to the temperature control equipment 116, and supplies a current from the direct-current charging station 404 to the battery 118.

For example, the charging control unit 330 supplies a current from the alternating-current charging inlet 102 to the temperature control equipment 116, and causes the temperature control equipment 116 to raise the temperature of the battery 118. The charging control unit 330 supplies the current from the direct-current charging inlet 104 to the battery 118 to charge the battery 118.

Thus, in the case where the temperature of the battery 118 is less than the predetermined value, the temperature control equipment 116 operates by the current supplied from the alternating-current charging station 402, and does not operate by the current supplied from the direct-current charging station 404. Therefore, the battery 118 can receive the current supplied from the direct-current charging station 404 without a part of the current supplied from the direct-current charging station 404 being used for the temperature control equipment 116. Therefore, the charging time can be shortened as compared with the case where the current is supplied from one power source to the temperature control equipment 116 and the battery 118.

Charging with the direct current supplied from the direct-current charging station 404 becomes quick charging that is faster than charging with the alternating current supplied from the alternating-current charging station 402. Therefore, the charging time can be shortened as compared with the case where the battery 118 is charged by receiving the current supplied from the alternating-current charging station 402.

The charging control unit 330 changes the current supplied to the battery 118 based on the temperature of the battery 118. For example, the charging control unit 330 performs control so as to increase the current to be supplied to the battery 118 as the temperature of the battery 118 increases. In FIG. 3, the charging control unit 330 transmits a command to the direct-current charging station 404 so that the current supplied from the direct-current charging station 404 linearly increases as the temperature of the battery 118 increases. This can shorten the charging time while suppressing the progress of deterioration of the battery 118 at the time of charging the battery 118.

Figure 4:
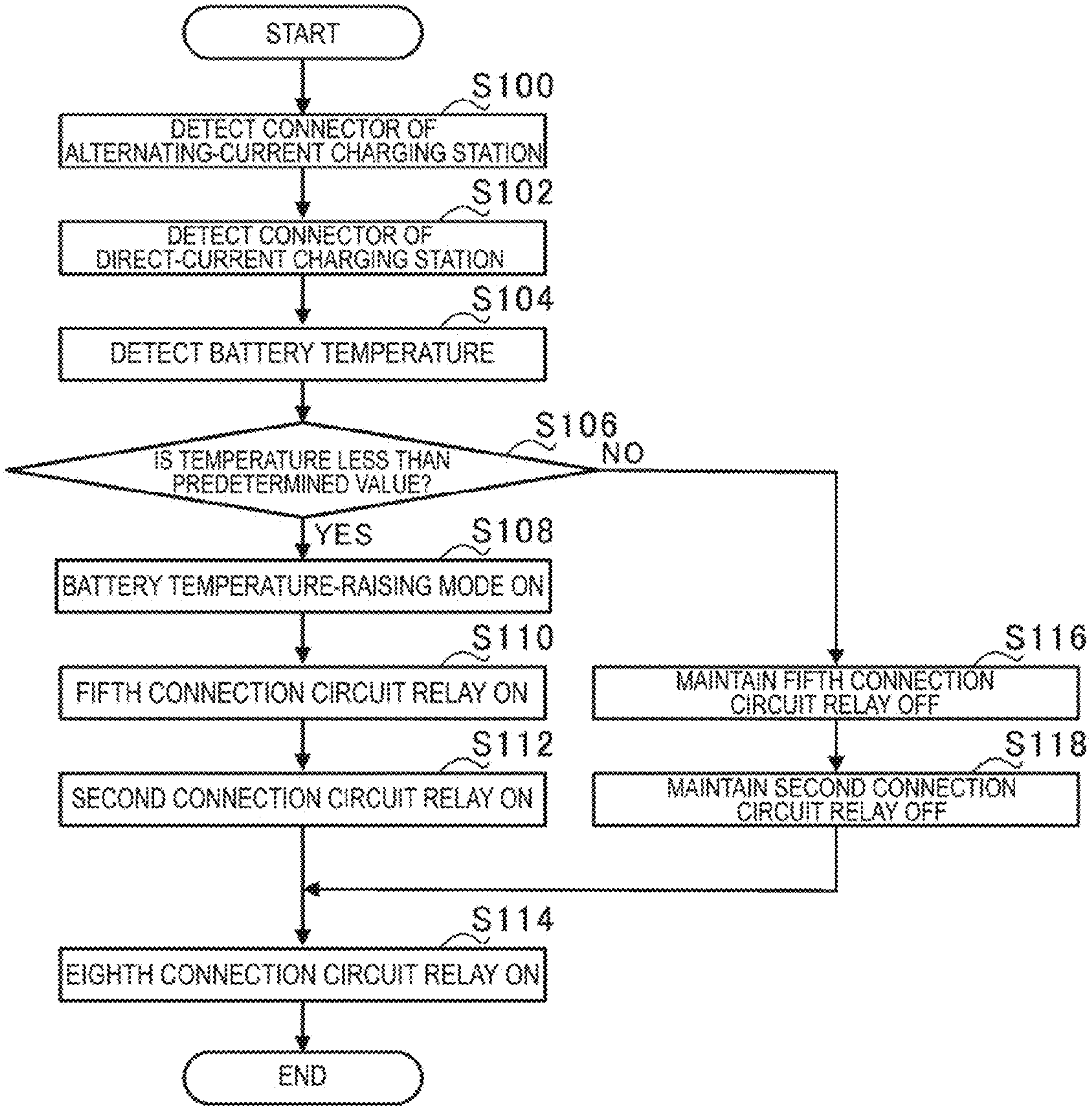
FIG. 4 is a flowchart of a charging control process at the start of execution of charging of the battery when the vehicle receives current supply from both the alternating-current charging station and the direct-current charging station.

FIG. 4 is a flowchart of the charging control process at the start of execution of charging of the battery 118 when the vehicle 100 receives current supply from both the alternating-current charging station 402 and the direct-current charging station 404.

As illustrated in FIG. 4, the inlet connection detection unit 310 detects that the connector 402*b* of the alternating-current charging station 402 is connected to the alternating-current charging inlet 102 (S100). The inlet connection detection unit 310 detects that the connector 404*b* of the direct-current charging station 404 is connected to the direct-current charging inlet 104 (S102).

The battery temperature detection unit 320 detects the temperature of the battery 118 (S104). Then, the charging control unit 330 determines whether the temperature of the battery 118 is less than a predetermined value based on the temperature of the battery 118 detected by the battery temperature detection unit 320 (S106).

In the case where the temperature of the battery 118 is less than the predetermined value (YES in S106), the charging control unit 330 controls a battery temperature-raising mode to go from an off state to an on state as a mode for raising the temperature of the battery 118 (S108). Note that the battery temperature-raising mode is set to the off state as an initial state.

When the battery temperature-raising mode is controlled to be in the on state, the charging control unit 330 controls the fifth connection circuit relay 210*a* to go from the off state to the on state (S110). When the fifth connection circuit relay 210*a* is controlled to be in the on state, the charging control unit 330 controls the second connection circuit relay 204*a* to go from the off state to the on state (S112). Note that the initial state of each relay is the off state. With this, the connection circuit 200 can be controlled to be in a battery temperature-raising state where a current is supplied to the temperature control equipment 116 with no current being supplied from the alternating-current charging inlet 102 to the battery 118. The temperature of the temperature control equipment 116 can be raised by the current from the alternating-current charging station 402.

When the second connection circuit relay 204*a* is controlled to be in the on state, the charging control unit 330 controls the eighth connection circuit relay 216*a* to go from the off state to the on state (S114). Thus, at the time of start of the charging control, in the case where the temperature of the battery 118 is less than the predetermined value, the charging control unit 330 controls the connection circuit 200 to be in a battery temperature-raising state. Thereafter, the charging control unit 330 starts current supply from the direct-current charging inlet 104 to the battery 118 and starts charging the battery 118. With this, after the connection circuit 200 is controlled to be in the battery temperature-raising state, the battery 118 can be charged by supplying a current from the direct-current charging inlet 104 to the battery 118. After S114, the charging control process at the start of execution of charging of the battery 118 ends.

On the other hand, when the temperature of the battery 118 is not less than the predetermined value (NO in S106), the charging control unit 330 maintains the fifth connection circuit relay 210*a* in the off state (S116), and maintains the second connection circuit relay 204*a* in the off state (S118). Thereafter, the process proceeds to the process of S114, and the charging control process at the start of execution of charging of the battery 118 ends. With this, the battery 118 can be charged by supplying a current from the direct-current charging inlet 104 to the battery 118 without raising the temperature of the battery 118 with no current suppled from the alternating-current charging inlet 102 to the temperature control equipment 116.

Figure 5:
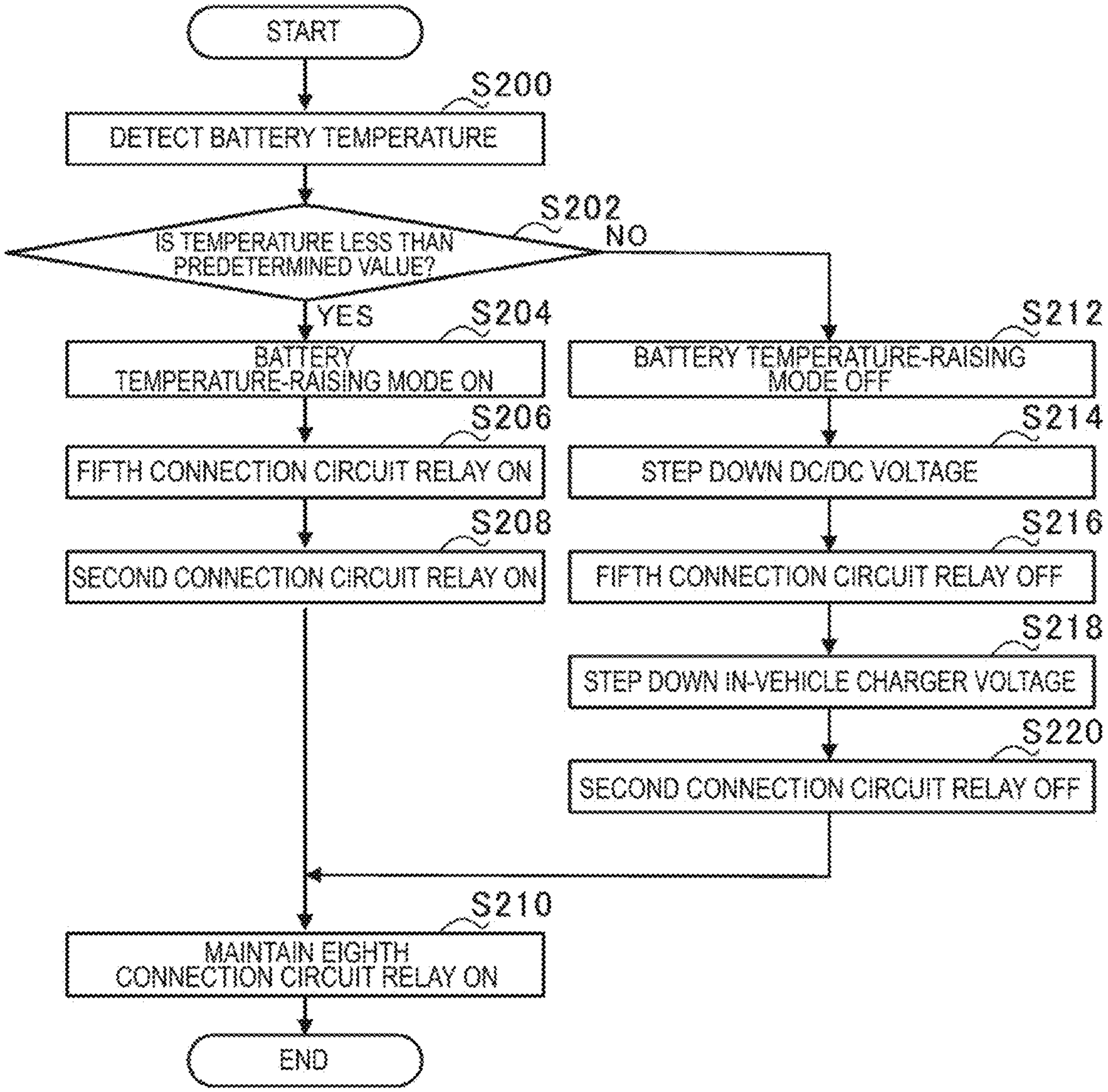
FIG. 5 is a flowchart of a charging control process in execution of charging of the battery when the vehicle receives current supply from both the alternating-current charging station and the direct-current charging station.

FIG. 5 is a flowchart of the charging control process in execution of charging of the battery 118 when the vehicle 100 receives current supply from both the alternating-current charging station 402 and the direct-current charging station 404.

As illustrated in FIG. 5, the battery temperature detection unit 320 detects the temperature of the battery 118 (S200). The charging control unit 330 determines whether the temperature of the battery 118 is less than a predetermined value based on the temperature of the battery 118 detected by the battery temperature detection unit 320 (S202).

In the case where the temperature of the battery 118 is less than the predetermined value (YES in S202), the charging control unit 330 controls the battery temperature-raising mode to go from the off state to the on state as a mode for raising the temperature of the battery 118 (S204).

When the battery temperature-raising mode is controlled to be in the on state, the charging control unit 330 controls the fifth connection circuit relay 210*a* to go from the off state to the on state (S206). When the fifth connection circuit relay 210*a* is controlled to be in the on state, the charging control unit 330 controls the second connection circuit relay 204*a* to go from the off state to the on state (S208). Thus, in execution of the charging control, when the temperature of the battery 118 falls below the predetermined value, the connection circuit 200 is controlled to be in the battery temperature-raising state. With this, the connection circuit 200 can be controlled to be in a battery temperature-raising state where a current is supplied to the temperature control equipment 116 with no current being supplied from the alternating-current charging inlet 102 to the battery 118. The temperature of the temperature control equipment 116 can be raised by the current from the alternating-current charging station 402.

When the second connection circuit relay 204*a* is controlled to be in the on state, the charging control unit 330 maintains the eighth connection circuit relay 216*a* in the on state (S210). With this, after the connection circuit 200 is controlled to be in the battery temperature-raising state, the battery 118 can be charged by supplying a current from the direct-current charging inlet 104 to the battery 118. After S210, the charging control process in execution of charging of the battery 118 ends.

On the other hand, when the temperature of the battery 118 is not less than the predetermined value (NO in S202), the charging control unit 330 controls the battery temperature-raising mode to go from the on state to the off state (S212). When the battery temperature-raising mode is controlled to be in the off state, the charging control unit 330 steps down the voltage output from the DC/DC converter 108 (S214), and controls the fifth connection circuit relay 210*a* to go from the on state to the off state (S216). Here, when the fifth connection circuit relay 210*a* is rapidly brought into the off state without stepping down the voltage, components such as the fifth connection circuit 210 and the fifth connection circuit relay 210*a* may be damaged. Therefore, the voltage output from the DC/DC converter 108 is stepped down from the viewpoint of component protection.

Thereafter, the charging control unit 330 steps down the voltage output from the in-vehicle charger 106 from the viewpoint of component protection similarly to S214 (S218), and controls the second connection circuit relay 204*a* to go from the on state to the off state (S220). Thus, when the temperature of the battery 118 exceeds the predetermined value in execution of the charging control, the charging control unit 330 stops the current supply from the alternating-current charging inlet 102 to the temperature control equipment 116 and releases the battery temperature-raising state. With this, the battery 118 can be charged by supplying a current from the direct-current charging inlet 104 to the battery 118 without raising the temperature of the battery 118 with no current suppled from the alternating-current charging inlet 102 to the temperature control equipment 116. After S220, the process proceeds to S210, and the charging control process in execution of charging of the battery 118 ends.

In the present embodiment, by controlling the third connection circuit relay 206*a* to be in the off state and the second connection circuit relay 204*a* and the fifth connection circuit relay 210*a* to be in the on state, the connection circuit 200 is brought into the battery temperature-raising state where the current is supplied to the temperature control equipment 116 without being supplied from the alternating-current charging inlet 102 to the battery 118. At this time, the first connection circuit 202, the second connection circuit 204, the fifth connection circuit 210, and the seventh connection circuit 214 are formed as a detour circuit that detours the battery 118 and connects the alternating-current charging inlet 102 and the temperature control equipment 116.

At this time, by controlling the ninth connection circuit relay 218*a* to be in the off state and the eighth connection circuit relay 216*a* to the on state, after the connection circuit 200 is controlled to be in the battery temperature-raising state, the battery 118 can be charged by supplying a current from the direct-current charging inlet 104 to the battery 118.

At this time, the current supplied from the alternating current charging station 402 is supplied to temperature control equipment 116, and the current supplied from the direct-current charging station 404 is supplied to the battery 118. Thus, the current is supplied from different power sources to the temperature control equipment 116 and the battery 118, respectively. With this, since the current supplied from one power source to the battery 118 is supplied to the battery 118 without being used for the temperature control equipment 116, the charging time of the battery 118 can be shortened as compared with the case where a part of the current is used for the temperature control equipment 116.

Note that the vehicle 100 can also receive current supply only from the alternating-current charging station 402 or only from the direct-current charging station 404. As a supplement, charging control of the battery 118 in a case where the vehicle 100 receives current supply only from the alternating-current charging station 402 and in a case where the vehicle 100 receives current supply only from the direct-current charging station 404 will be described below.

Figure 6:
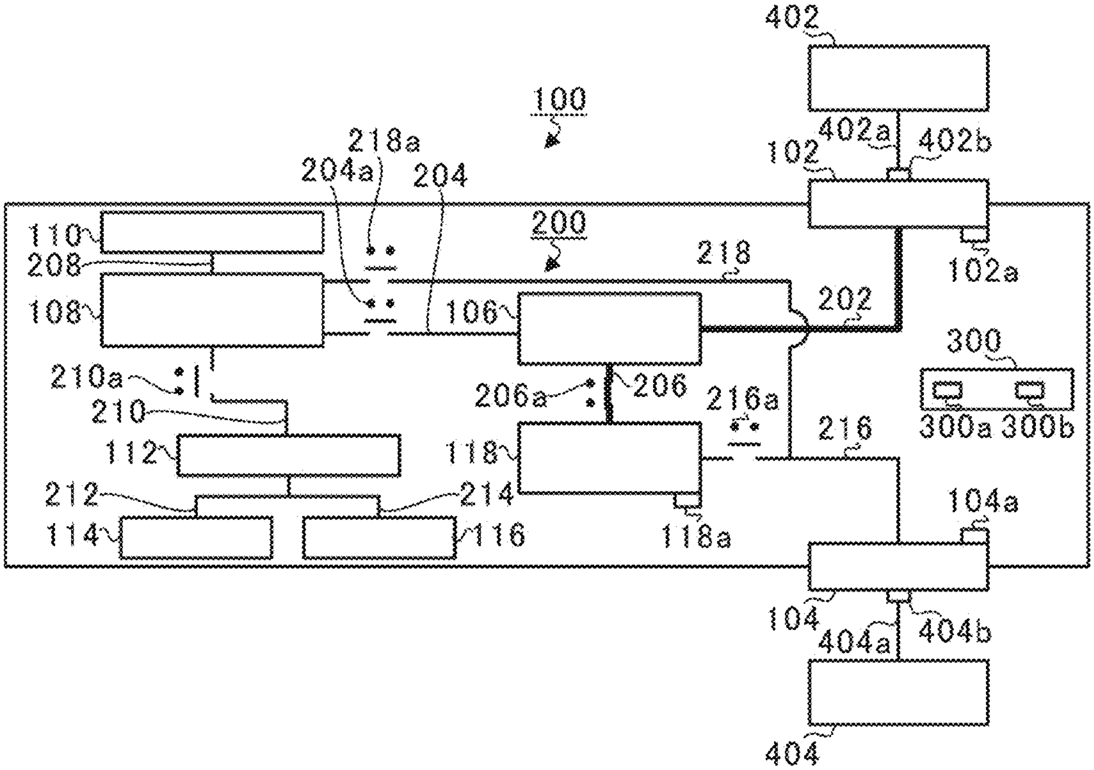
FIG. 6 is a first explanatory view illustrating an example of charging control of the battery when the vehicle receives current supply only from the alternating-current charging station.

FIG. 6 is the first explanatory view illustrating an example of charging control of the battery 118 when the vehicle 100 receives current supply only from the alternating-current charging station 402. In the figure, a thick line indicates a state where a current flows through each circuit. FIG. 6 describes the charging control in a case where the temperature of the battery 118 is equal to or greater than a predetermined value. Here, the predetermined value is, for example, 0° C.

For example, in FIG. 6, the inlet connection detection unit 310 is in a state of detecting the connection between the alternating-current charging inlet 102 and the connector 402*b* and not detecting the connection between the direct-current charging inlet 104 and the connector 404*b*. The battery temperature detection unit 320 is in a state of detecting the temperature of the battery 118 that exceeds 0° C.

The condition of the connection between the alternating-current charging inlet 102 and the connector 402*b*, the non-connection between the direct-current charging inlet 104 and the connector 404*b*, and the temperature of the battery 118 exceeding 0° C. is defined as a second condition.

When the state of the vehicle 100 satisfies the second condition, the charging control unit 330 executes charging control of charging the battery 118 by supplying a current from the alternating-current charging inlet 102 to the battery 118 without supplying a current from the alternating-current charging inlet 102 to the temperature control equipment 116.

For example, as illustrated in FIG. 6, the charging control unit 330 performs off-control on the second connection circuit relay 204*a*, the fifth connection circuit relay 210*a*, the eighth connection circuit relay 216*a*, and the ninth connection circuit relay 218*a*. With this, the second connection circuit 204, the fifth connection circuit 210, the eighth connection circuit 216, and the ninth connection circuit 218 are broken and each brought into a non-connected state.

On the other hand, the charging control unit 330 performs on-control on the third connection circuit relay 206*a*. With this, the third connection circuit 206 is conducted and brought into a connected state. This can supply the current from the alternating-current charging inlet 102 to the battery 118 without supplying the current from the alternating-current charging inlet 102 to the temperature control equipment 116. That is, when no current is supplied to the direct-current charging inlet 104 and the current is supplied only to the alternating-current charging inlet 102, the charging control unit 330 supplies the current from the alternating-current charging inlet 102 to the battery 118 to charge the battery 118. This enables normal charging to be performed from the alternating-current charging station 402 to the battery 118 without raising the temperature of the battery 118.

Figure 7:
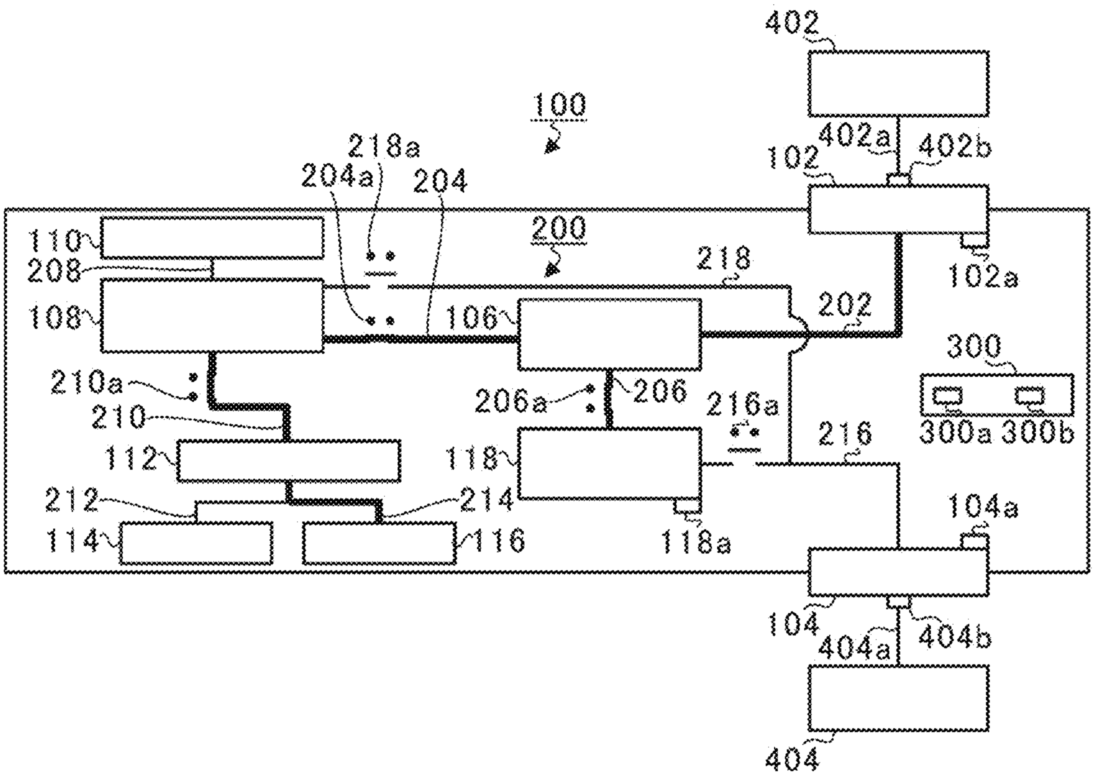
FIG. 7 is a second explanatory view illustrating an example of charging control of the battery when the vehicle receives current supply only from the alternating-current charging station.

FIG. 7 is the second explanatory view illustrating an example of charging control of the battery 118 when the vehicle 100 receives current supply only from the alternating-current charging station 402. In FIG. 7 describes charging control when the temperature of the battery 118 becomes less than a predetermined value.

For example, in FIG. 7, the inlet connection detection unit 310 is in a state of detecting the connection between the alternating current charging inlet 102 and the connector 402*b* and not detecting the connection between the direct-current charging inlet 104 and the connector 404*b*. The battery temperature detection unit 320 is in a state of detecting the temperature of the battery 118 that becomes less than 0° C.

The condition of the connection between the alternating-current charging inlet 102 and the connector 402*b*, the non-connection between the direct-current charging inlet 104 and the connector 404*b*, and the temperature of the battery 118 becoming less than 0° C. is defined as a third condition.

When the state of the vehicle 100 satisfies the third condition, the charging control unit 330 executes charging control of charging the battery 118 by supplying a current from the alternating-current charging inlet 102 to the battery 118 while supplying a current from the alternating-current charging inlet 102 to the temperature control equipment 116.

For example, as illustrated in FIG. 7, the charging control unit 330 performs off-control on the eighth connection circuit relay 216*a* and the ninth connection circuit relay 218*a*. With this, the eighth connection circuit 216 and the ninth connection circuit 218 are broken and each brought into a non-connected state.

On the other hand, the charging control unit 330 performs on-control on the second connection circuit relay 204*a*, the third connection circuit relay 206*a*, and the fifth connection circuit relay 210*a*. With this, the second connection circuit 204, the third connection circuit 206, and the fifth connection circuit 210 are conducted and brought into a connected state. This can supply the current from the alternating-current charging inlet 102 to the battery 118 while supplying the current from the alternating-current charging inlet 102 to the temperature control equipment 116 and raising the temperature of the battery 118 by the temperature control equipment 116.

Here, in the case where the temperature of the battery 118 is less than the predetermined value, it is necessary to raise the temperature of the battery 118 to be equal to or greater than the predetermined value as described above. Therefore, in FIG. 7, the charging control unit 330 supplies a current from the alternating-current charging inlet 102 to the temperature control equipment 116, and causes the temperature control equipment 116 to raise the temperature of the battery 118. The charging control unit 330 supplies the current from the alternating-current charging inlet 102 to the battery 118 to charge the battery 118.

Thus, in the case where the temperature of the battery 118 is less than the predetermined value, as illustrated in FIG. 7, the battery 118 can be charged while the temperature of the battery 118 is raised by the temperature control equipment 116. That is, when no current is supplied to the direct-current charging inlet 104 and the current is supplied only to the alternating-current charging inlet 102, the charging control unit 330 supplies the current from the alternating-current charging inlet 102 to the temperature control equipment 116. With this, when charging the battery 118, it is possible to shorten the charging time and suppress the degree of progress of deterioration of the battery 118 as compared with a case of not raising the temperature of the battery 118 to be equal to or greater than a predetermined value.

Figure 8:
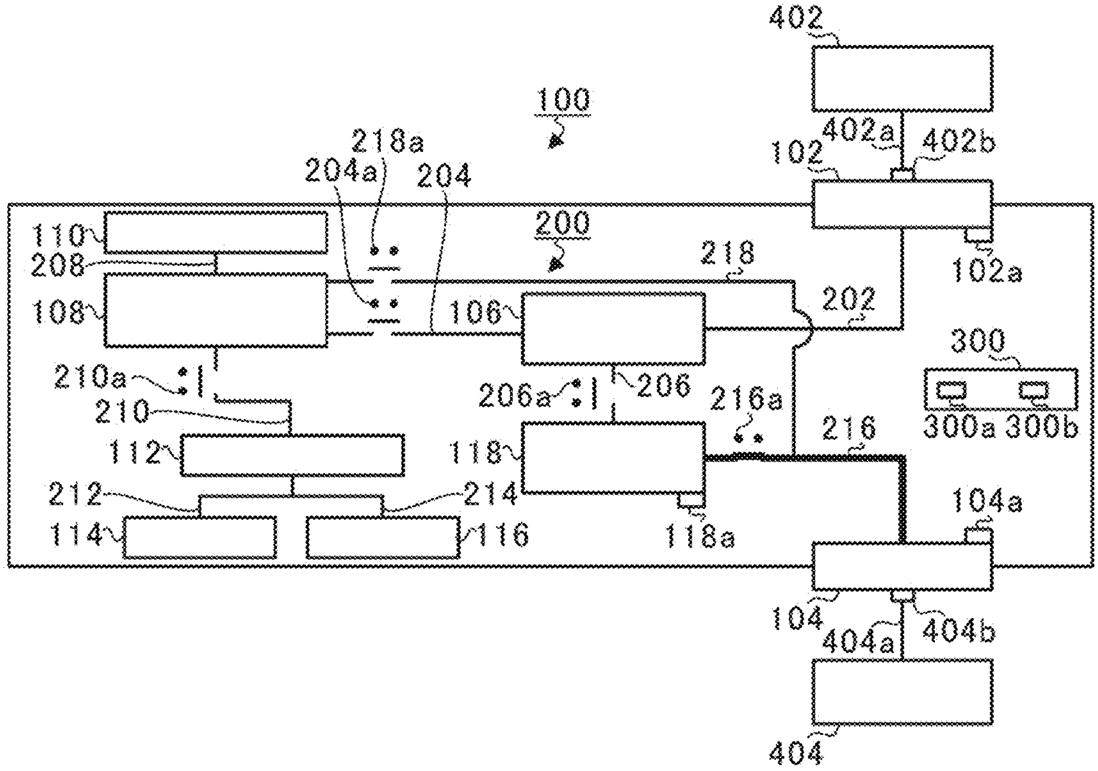
FIG. 8 is a first explanatory view illustrating an example of charging control of the battery when the vehicle receives current supply only from the direct-current charging station.

FIG. 8 is the first explanatory view illustrating an example of charging control of the battery 118 when the vehicle 100 receives current supply only from the direct-current charging station 404. FIG. 8 describes the charging control in a case where the temperature of the battery 118 is equal to or greater than a predetermined value.

For example, in FIG. 8, the inlet connection detection unit 310 is in a state of detecting the connection between the direct-current charging inlet 104 and the connector 404*b* and not detecting the connection between the alternating-current charging inlet 102 and the connector 402*b*. The battery temperature detection unit 320 is in a state of detecting the temperature of the battery 118 that exceeds 0° C.

The condition of the non-connection between the alternating-current charging inlet 102 and the connector 402*b*, the connection between the direct-current charging inlet 104 and the connector 404*b*, and the temperature of the battery 118 exceeding 0° C. is defined as a fourth condition.

When the state of the vehicle 100 satisfies the fourth condition, the charging control unit 330 executes charging control of charging the battery 118 by supplying a current from the direct-current charging inlet 104 to the battery 118 without supplying a current from the direct-current charging inlet 104 to the temperature control equipment 116.

For example, as illustrated in FIG. 8, the charging control unit 330 performs off-control on the second connection circuit relay 204*a*, the third connection circuit relay 206*a*, the fifth connection circuit relay 210*a*, and the ninth connection circuit relay 218*a*. With this, the second connection circuit 204, the third connection circuit 206, the fifth connection circuit 210, and the ninth connection circuit 218 are broken and each brought into a non-connected state.

On the other hand, the charging control unit 330 performs on-control on the eighth connection circuit relay 216*a*. With this, the eighth connection circuit 216 is conducted and brought into a connected state. This can supply the current from the direct-current charging inlet 104 to the battery 118 without supplying the current from the direct-current charging inlet 104 to the temperature control equipment 116. That is, when no current is supplied to the alternating-current charging inlet 102 and the current is supplied only to the direct-current charging inlet 104, the charging control unit 330 supplies the current from the direct-current charging inlet 104 to the battery 118 to charge the battery 118. This enables quick charging to be performed from the direct-current charging station 404 to the battery 118 without raising the temperature of the battery 118.

Figure 9:
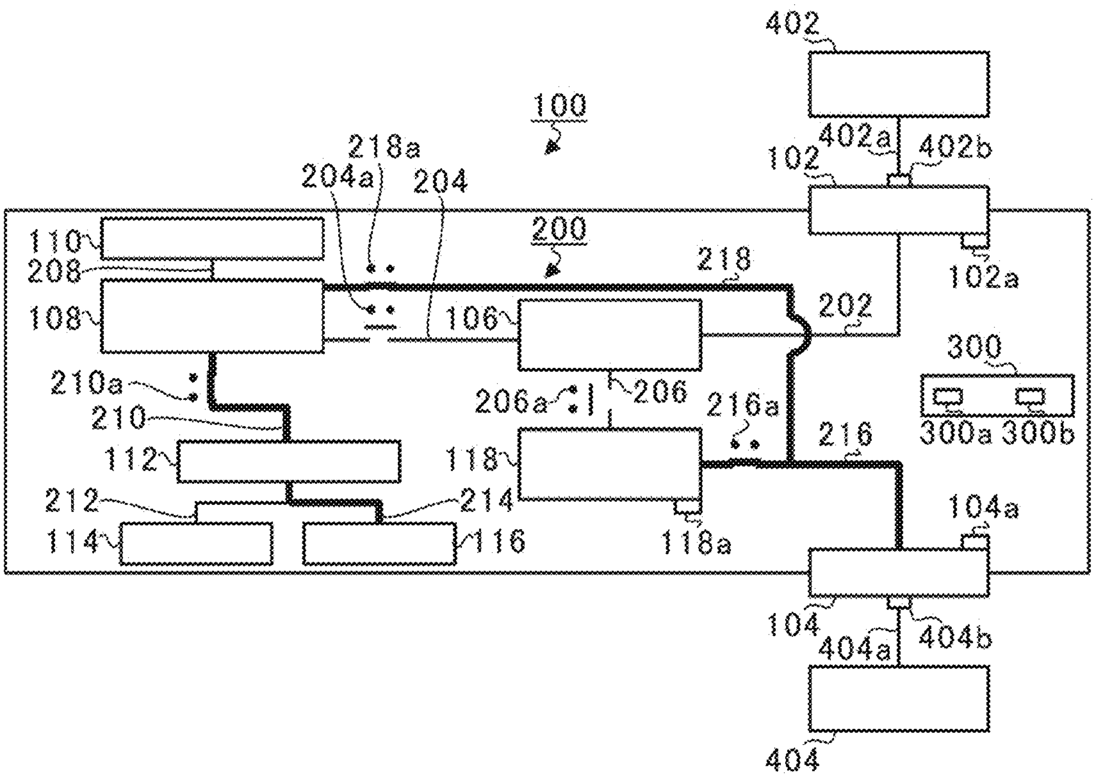
FIG. 9 is a second explanatory view illustrating an example of charging control of the battery when the vehicle receives current supply only from the direct-current charging station.

FIG. 9 is the second explanatory view illustrating an example of charging control of the battery 118 when the vehicle 100 receives current supply only from the direct-current charging station 404. In FIG. 9 describes charging control when the temperature of the battery 118 becomes less than a predetermined value.

For example, in FIG. 9, the inlet connection detection unit 310 is in a state of detecting the connection between the direct-current charging inlet 104 and the connector 404*b* and not detecting the connection between the alternating-current charging inlet 102 and the connector 402*b*. The battery temperature detection unit 320 is in a state of detecting the temperature of the battery 118 that becomes less than 0° C.

The condition of the non-connection between the alternating-current charging inlet 102 and the connector 402*b*, the connection between the direct-current charging inlet 104 and the connector 404*b*, and the temperature of the battery 118 becoming less than 0° C. is defined as a fifth condition.

When the state of the vehicle 100 satisfies the fifth condition, the charging control unit 330 executes charging control of charging the battery 118 by supplying a current from the direct-current charging inlet 104 to the battery 118 while supplying a current from the direct-current charging inlet 104 to the temperature control equipment 116.

For example, as illustrated in FIG. 9, the charging control unit 330 performs off-control on the second connection circuit relay 204*a* and the third connection circuit relay 206*a*. With this, the second connection circuit 204 and the third connection circuit 206 are broken and each brought into a non-connected state.

On the other hand, the charging control unit 330 performs on-control on the fifth connection circuit relay 210*a*, the eighth connection circuit relay 216*a*, and the ninth connection circuit relay 218*a*. With this, the fifth connection circuit 210, the eighth connection circuit 216, and the ninth connection circuit 218 are conducted and brought into a connected state. That is, when no current is supplied to the alternating-current charging inlet 102 and the current is supplied only to the direct-current charging inlet 104, the charging control unit 330 supplies the current from the direct-current charging inlet 104 to the temperature control equipment 116. This can supply the current from the direct-current charging inlet 104 to the battery 118 while supplying the current from the direct-current charging inlet 104 to the temperature control equipment 116 and raising the temperature of the battery 118 by the temperature control equipment 116.

Thus, in the case where the temperature of the battery 118 is less than the predetermined value, as illustrated in FIG. 9, the battery 118 can be charged while the temperature of the battery 118 is raised by the temperature control equipment 116. With this, when charging the battery 118, it is possible to shorten the charging time and suppress the degree of progress of deterioration of the battery 118 as compared with a case of not raising the temperature of the battery 118 to be equal to or greater than a predetermined value.

Figure 10:
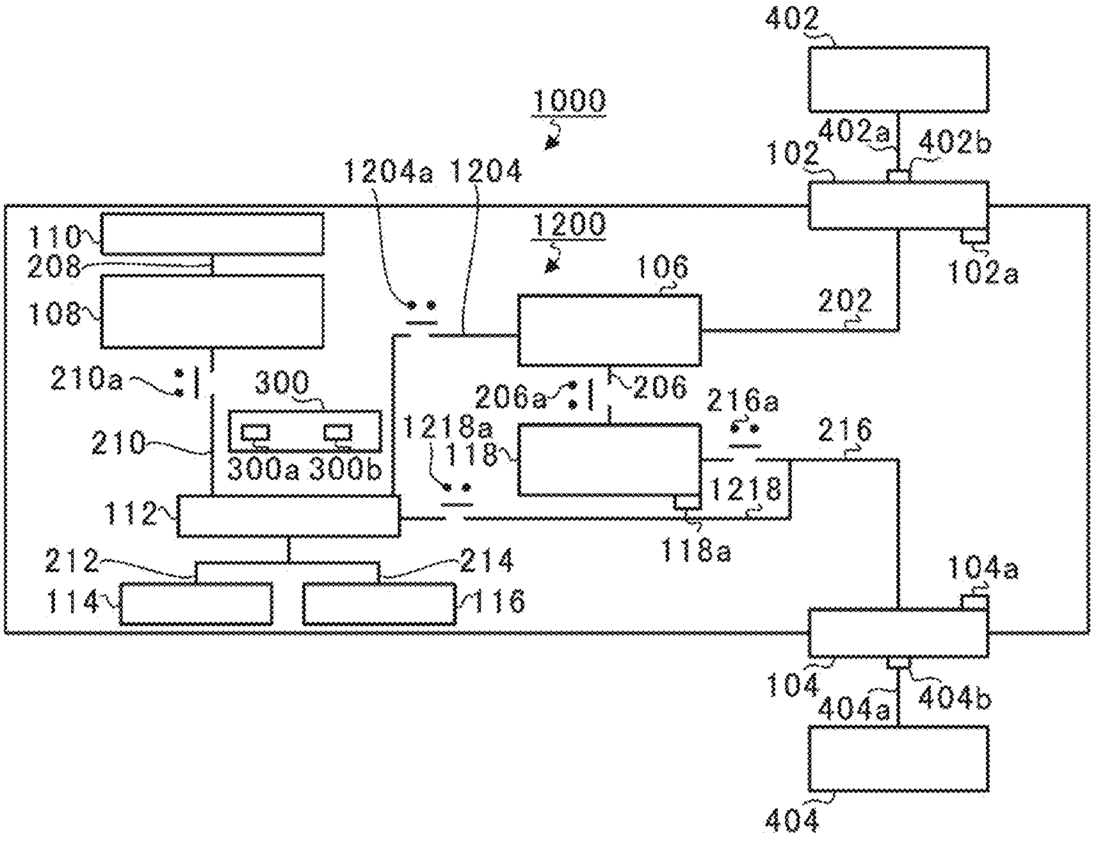
FIG. 10 is an explanatory view for describing a schematic configuration of a vehicle according to a modification.

FIG. 10 is an explanatory view for describing a schematic configuration of a vehicle 1000 according to the modification. Constituent elements substantially equal to those of the vehicle 100 of the above embodiment are denoted by the same reference signs, and description thereof is omitted. The vehicle 1000 of the present modification includes a connection circuit 1200 different from the connection circuit 200 of the above embodiment. The connection circuit 1200 of the present modification differs from the connection circuit 200 of the above embodiment only in the configurations of a second connection circuit 1204 and a ninth connection circuit 1218, and the other configurations are the same. Therefore, the second connection circuit 1204 and the ninth connection circuit 1218 will be described in detail below.

The second connection circuit 1204 electrically connects the in-vehicle charger 106 and the junction box 112. The second connection circuit 1204 supplies a direct current from the in-vehicle charger 106 to the junction box 112.

The ninth connection circuit 1218 electrically connects the eighth connection circuit 216 and the junction box 112. The ninth connection circuit 218 is a branch circuit branched from the eighth connection circuit 216. The ninth connection circuit 1218 supplies a direct current from the direct-current charging inlet 104 to the junction box 112 via a part of the eighth connection circuit 216. Here, a relay not illustrated in the junction box 112 can supply the current supplied from the second connection circuit 1204 or the ninth connection circuit 1218 to the temperature control equipment 116 via the seventh connection circuit 214.

The second connection circuit relay 1204*a* is provided in the second connection circuit 1204. The second connection circuit relay 1204*a* is controlled to be on/off by the control device 300 to bring the in-vehicle charger 106 and the junction box 112 into a connected state or a non-connected state.

The ninth connection circuit relay 1218*a* is provided in the ninth connection circuit 1218. The ninth connection circuit relay 1218*a* is controlled to be on/off by the control device 300 to bring the direct-current charging inlet 104 and the junction box 112 into a connected state or a non-connected state.

In the present modification, by controlling the third connection circuit relay 206*a* to be in the off state and the second connection circuit relay 1204*a* to be in the on state, the connection circuit 1200 is brought into the battery temperature-raising state where the current is supplied to the temperature control equipment 116 without being supplied from the alternating-current charging inlet 102 to the battery 118. At this time, the first connection circuit 202, the second connection circuit 1204, and the seventh connection circuit 214 are formed as a detour circuit that detours the battery 118 and connects the alternating-current charging inlet 102 and the temperature control equipment 116.

At this time, by controlling the ninth connection circuit relay 1218*a* to be in the off state and the eighth connection circuit relay 216*a* to the on state, after the connection circuit 1200 is controlled to be in the battery temperature-raising state, the battery 118 can be charged by supplying a current from the direct-current charging inlet 104 to the battery 118. According to the present modification, the same operations and effects as those of the above embodiment can be obtained.

While a preferred embodiment of the disclosure has been described above with reference to the accompanying drawings, the disclosure is not limited to such an embodiment. It is apparent to those skilled in the art that various modified examples and modifications may be conceived in the scope of the claims, and it is thus acknowledged that those modified examples and modifications are also naturally included in the technical scope of the disclosure.

Note that the series of processes by each device (e.g., the control device 300) according to the present embodiment described above may be implemented by using any of software, hardware, or a combination of software and hardware. The program constituting the software is stored in advance in a non-transitory storage medium provided inside or outside each device, for example. Then, the program is read, for example, from the non-transitory storage medium (e.g., ROM) to a transitory storage medium (e.g., RAM), and is executed by a processor such as a CPU.

It is possible to create a program for implementing each function of each of the devices and install the program in a computer of each of the devices. The processor executes the program stored in the memory, thereby executing the process of each of the functions. At this time, the program may be shared and executed by a plurality of processors, or the program may be executed by one processor. Each function of each of the devices may be implemented by cloud computing using a plurality of computers connected mutually via a communication network.

Note that the program may be provided to and installed in a computer of each device by distribution from an external device via a communication network. Alternatively, the program may be stored in a non-transitory computer-readable medium readable by a computer, and provided to and installed in the computer of each device via the storage medium.

According to the present embodiment, it is possible to provide a program for executing a process of each function of each of the devices. Furthermore, it is also possible to provide a non-transitory computer-readable storage medium storing the program. The non-transitory storage medium may be, for example, a disk storage medium such as an optical disk, a magnetic disk, or a magneto-optical disk, or may be a semiconductor memory such as a flash memory or a USB memory.

REFERENCE SIGNS LIST

100 vehicle
102 alternating-current charging inlet
104 direct-current charging inlet
106 in-vehicle charger
108 DC/DC converter
110 auxiliary machine
112 junction box
114 air conditioner
116 temperature control equipment
118 battery
200 connection circuit
202 first connection circuit
204 second connection circuit
204*a* second connection circuit relay
206 third connection circuit
206*a* third connection circuit relay
208 fourth connection circuit
210 fifth connection circuit
210*a* fifth connection circuit relay
212 sixth connection circuit
214 seventh connection circuit
216 eighth connection circuit
216*a* eighth connection circuit relay
218 ninth connection circuit
218*a* ninth connection circuit relay
300 control device
310 inlet connection detection unit
320 battery temperature detection unit
330 charging control unit

The invention claimed is:

1. A vehicle comprising:

a direct-current charging inlet;

an alternating-current charging inlet;

a battery configured to drive a motor, the battery being connectable to the direct-current charging inlet and the alternating-current charging inlet;

temperature control equipment configured to raise a temperature of the battery;

a connection circuit that connects the direct-current charging inlet, the alternating-current charging inlet, the battery, and the temperature control equipment; and a control device configured to execute charging control of charging the battery, wherein the connection circuit comprises a detour circuit that detours around the battery and connects the alternating-current charging inlet and the temperature control equipment, the control device comprises one or more processors, and one or more memories connected to the one or more processors, and the one or more processors are configured to, when the temperature of the battery is less than a predetermined value in the charging control, execute a process comprising:

controlling the connection circuit to be in a battery temperature-raising state where a current is supplied from the alternating-current charging inlet to the temperature control equipment through the detour circuit with no current being supplied from the alternating-current charging inlet to the battery; and while the connection circuit is in the battery temperature-raising state, charging the battery by supplying a current from the direct-current charging inlet to the battery.

2. A vehicle comprising:

a direct-current charging inlet;

an alternating-current charging inlet;

a battery configured to drive a motor, the battery being connectable to the direct-current charging inlet and the alternating-current charging inlet;

temperature control equipment configured to raise a temperature of the battery;

a connection circuit that connects the direct-current charging inlet, the alternating-current charging inlet, the battery, and the temperature control equipment, wherein the connection circuit comprises a detour circuit that detours around the battery and connects the alternating-current charging inlet and the temperature control equipment;

a control device configured to execute charging control of charging the battery, wherein the control device comprises:

one or more processors; and one or more memories connected to the one or more processors, and the one or more processors are configured to, when the temperature of the battery is less than a predetermined value in the charging control, execute a process comprising charging the battery by supplying a current from the direct-current charging inlet to the battery, after controlling the connection circuit to be in a battery temperature-raising state where a current is supplied to the temperature control equipment with no current being supplied from the alternating-current charging inlet to the battery.

3. The vehicle according to claim 2, wherein the one or more processors are configured to, when the temperature of the battery is less than the predetermined value at a start of the charging control, execute a process comprising starting current supply from the direct-current charging inlet to the battery and starting charging of the battery, after controlling the connection circuit to be in the battery temperature-raising state.

4. The vehicle according to claim 3, wherein the one or more processors are configured to, when the temperature of the battery exceeds the predetermined value during execution of the charging control, execute a process comprising stopping current supply from the alternating-current charging inlet to the temperature control equipment and releasing the battery temperature-raising state.

5. The vehicle according to claim 4, wherein the one or more processors are configured to, when the temperature of the battery falls below the predetermined value during the execution of the charging control, execute a process comprising controlling the connection circuit to be in the battery temperature-raising state.

6. The vehicle according to claim 2, wherein the one or more processors are configured to change the current supplied to the battery based on the temperature of the battery.

7. The vehicle according to claim 2, wherein the one or more processors are configured to, when the current is supplied only to the alternating-current charging inlet with no current being supplied to the direct-current charging inlet in the charging control, charge the battery by supplying the current from the alternating-current charging inlet to the battery.

8. The vehicle according to claim 2, wherein the one or more processors are configured to, when the current is supplied only to the direct-current charging inlet with no current being supplied to the alternating-current charging inlet in the charging control, supply the current from the direct-current charging inlet to the temperature control equipment.

9. The vehicle according to claim 3, wherein the one or more processors are configured to change the current supplied to the battery based on the temperature of the battery.

10. The vehicle according to claim 4, wherein the one or more processors are configured to change the current supplied to the battery based on the temperature of the battery.

11. The vehicle according to claim 5, wherein the one or more processors are configured to change the current supplied to the battery based on the temperature of the battery.

12. The vehicle according to claim 3, wherein the one or more processors are configured to, when the current is supplied only to the alternating-current charging inlet with no current being supplied to the direct-current charging inlet in the charging control, charge the battery by supplying the current from the alternating-current charging inlet to the battery.

13. The vehicle according to claim 4, wherein the one or more processors are configured to, when the current is supplied only to the alternating-current charging inlet with no current being supplied to the direct-current charging inlet in the charging control, charge the battery by supplying the current from the alternating-current charging inlet to the battery.

14. The vehicle according to claim 5, wherein the one or more processors are configured to, when the current is supplied only to the alternating-current charging inlet with no current being supplied to the direct-current charging inlet in the charging control, charge the battery by supplying the current from the alternating-current charging inlet to the battery.

15. The vehicle according to claim 3, wherein the one or more processors are configured to, when the current is supplied only to the direct-current charging inlet with no current being supplied to the alternating-current charging inlet in the charging control, supply the current from the direct-current charging inlet to the temperature control equipment.

16. The vehicle according to claim 4, wherein the one or more processors are configured to, when the current is supplied only to the direct-current charging inlet with no current being supplied to the alternating-current charging inlet in the charging control, supply the current from the direct-current charging inlet to the temperature control equipment.

17. The vehicle according to claim 5, wherein the one or more processors are configured to, when the current is supplied only to the direct-current charging inlet with no current being supplied to the alternating-current charging inlet in the charging control, supply the current from the direct-current charging inlet to the temperature control equipment.

* * * * *